United States Patent
Ahn et al.

(10) Patent No.: US 7,824,758 B2
(45) Date of Patent: Nov. 2, 2010

(54) FILTER FOR DISPLAY DEVICE AND METHOD FOR FABRICATING THE SAME

(75) Inventors: Duck Ki Ahn, ChungCheongNam-Do (KR); In Sung Sohn, ChungCheongNam-Do (KR)

(73) Assignee: Samsung Corning Precision Glass Co., Ltd. (KR)

( * ) Notice: Subject to any disclaimer, the term of this patent is extended or adjusted under 35 U.S.C. 154(b) by 0 days.

(21) Appl. No.: 12/252,466

(22) Filed: Oct. 16, 2008

(65) Prior Publication Data

US 2009/0104413 A1 Apr. 23, 2009

(30) Foreign Application Priority Data

Oct. 18, 2007 (KR) .................. 10-2007-0105260

(51) Int. Cl.
*B41M 5/00* (2006.01)
*B44C 1/17* (2006.01)
*G03G 7/00* (2006.01)

(52) U.S. Cl. .................. 428/195.1; 428/1.31; 427/96.3; 313/112; 359/614

(58) Field of Classification Search .......... 428/1.31, 428/195.1, 411.1; 427/96.1, 96.2, 96.3; 313/112; 359/614
See application file for complete search history.

(56) References Cited

U.S. PATENT DOCUMENTS

| | | | | |
|---|---|---|---|---|
| 7,719,188 | B2 * | 5/2010 | Ryu et al. ............... | 313/582 |
| 2002/0046851 | A1 * | 4/2002 | Marutsuka ............ | 174/35 MS |
| 2004/0090170 | A1 * | 5/2004 | Cha et al. .............. | 313/489 |
| 2004/0160183 | A1 * | 8/2004 | Kim ...................... | 313/582 |
| 2006/0043895 | A1 * | 3/2006 | Choi ..................... | 313/587 |
| 2006/0145578 | A1 * | 7/2006 | Park et al. ............. | 313/112 |
| 2006/0194020 | A1 * | 8/2006 | Naito et al. ........... | 428/138 |

FOREIGN PATENT DOCUMENTS

KR 100708745 4/2007
KR 20070035995 A 4/2007

OTHER PUBLICATIONS

Office Action from Korean Application No. 10-2007-0105260, mailed Jun. 21, 2010.

* cited by examiner

*Primary Examiner*—Mark Ruthkosky
*Assistant Examiner*—David J Joy
(74) *Attorney, Agent, or Firm*—Lerner, David, Littenberg, Krumholz & Mentlik, LLP

(57) ABSTRACT

A filter for a display device and a method for fabricating the filter are provided. The filter includes a base including a transparent polymer resin and a color compensation colorant mixed in the transparent polymer resin, an external light blocking pattern formed at the base, and an electromagnetic wave blocking layer formed on the base.

12 Claims, 3 Drawing Sheets

FILTER FOR DISPLAY DEVICE AND METHOD FOR FABRICATING THE SAME

CROSS-REFERENCE TO RELATED APPLICATION

This application claims the benefit of Korean Patent Application No. 10-2007-0105260 filed on Oct. 18, 2007 with the Korean Intellectual Property Office, the disclosure of which is incorporated herein by reference.

BACKGROUND OF THE INVENTION

1. Field of the Invention

The present invention relates to a filter for a display device and a method for fabricating the same.

2. Description of the Related Art

Display devices include televisions, monitors of personal computers, portable display devices, and so on. The display devices are recently getting larger sized and thinner.

Accordingly, flat panel display (FPD) devices such as plasma display panel (PDP) devices, liquid crystal display (LCD) devices, field emission display (FED) devices, and organic light emitting display (OLED) devices take the place of for cathode ray tube (CRT) device, which was representative of display devices.

Hereinafter, the PDP devices and a filter therefor will be exemplified but the present invention is not limited thereto. For example, a filter according to the present invention can be used for large sized display devices such as the OLED devices, the LCD devices and the FED devices; small sized display devices such as Personal Digital Assistance (PDA) devices, display devices for small sized games, display devices for small mobile phones; and flexible display devices.

Especially, the PDP device is in the limelight since it has excellent display characteristics such as a high luminance, a high contrast ratio, a low after-image, and a wide viewing angle.

The PDP device causes gas discharge between electrodes by applying a direct or alternating voltage to the electrodes, then fluorescent material is activated by ultraviolet radiation caused by the gas discharge, and thereby light is generated. The PDP device displays images by using the generated light.

However, the PDP device has drawbacks that a large amount of electromagnetic waves and near infrared rays is emitted due to its intrinsic characteristics. The electromagnetic waves and near infrared rays emitted from the PDP device may have a harmful effect to the human body, and cause malfunction of precision appliances such as a cellular phone and a remote controller. Further, the PDP device has a high surface reflection and has lower color purity than the CRT device due to orange color light emitted from gas such as He or Xe.

Therefore, the PDP device employs a PDP filter in order to block electromagnetic waves and near infrared rays, reduce light reflection, and improve color purity. The PDP filter is installed in front of a panel assembly. The PDP filter is generally manufactured by adhering or bonding a plurality of functional layers such as an electromagnetic wave blocking layer, etc.

In order that the filter can have the above mentioned functions, a plurality of layers each of which has its own function has to be stacked. This increases the cost of the display device, and weakens competitiveness of the display device.

In addition, since a glass which is thick and has low flexibility is typically used as a transparent substrate for the filter, it is difficult to use the filter for a flexible display device.

SUMMARY OF THE INVENTION

The present invention is intended to solve the foregoing problems with the conventional art. An object of the present invention is to provide a filter for a display device and a method for fabricating the filter which has simple structure and enables the cost to reduce.

Another object of the present invention is to provide a filter which is light-weight and thin and a method for fabricating the same.

Still another object of the present invention to provide a filter which has high flexibility and a method for fabricating the same.

In order to attain the above-mentioned objects, the present invention provides a filter for a display device which includes a base including transparent polymer resin and a color compensation colorant mixed in the transparent polymer resin; an external light blocking pattern formed at the base; and an electromagnetic wave blocking layer formed on the base;

In addition, the present invention also provides a method for fabricating a filter for a display device comprising the steps of: preparing a base which includes transparent polymer resin and a color compensation colorant mixed in the transparent polymer resin; forming an external light blocking pattern at the base; and forming an electromagnetic wave blocking layer on the base.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EXEMPLARY EMBODIMENT

The present invention will now be described more fully hereinafter with reference to the accompanying drawings, in which exemplary embodiments thereof are shown.

In the following embodiment, a filter for a PDP device will be exemplified, but the present invention is not limited thereto. A filter according to the present invention can be used for other display devices such as an LCD device, an OLED device, etc. as well as the PDP device.

Figure 1:
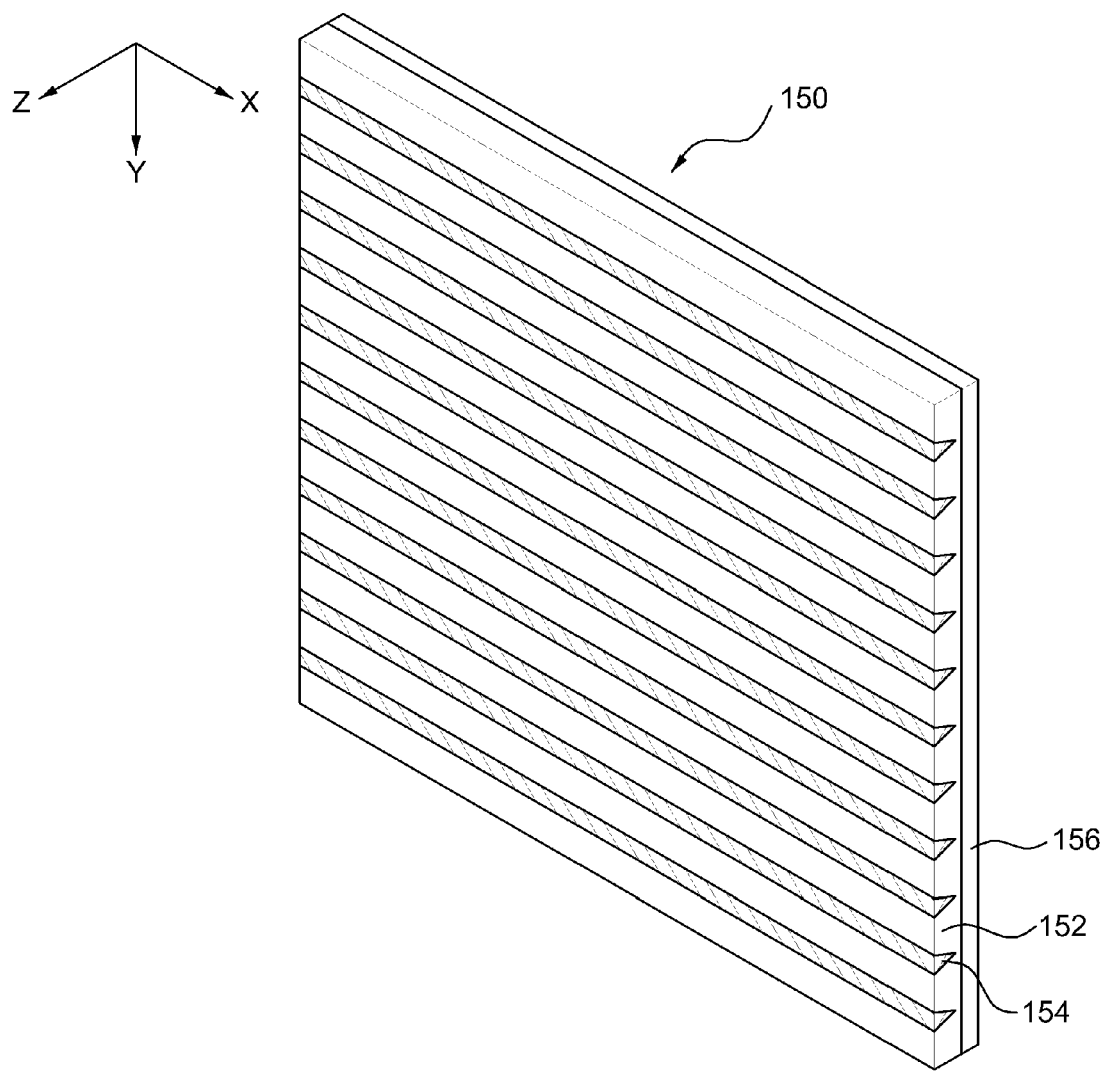
FIG. 1 is a perspective view schematically illustrating a filter for a display device according to one embodiment of the present invention.
Figure 2:
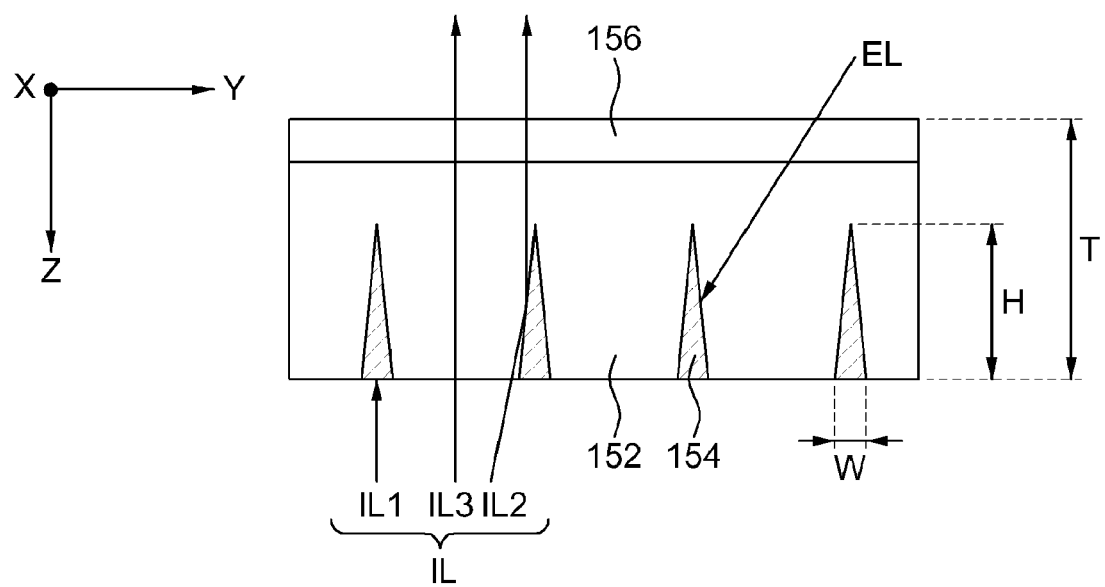
FIG. 2 is a cross-sectional view for explaining the filter of FIG. 1 in detail.

FIG. 1 is a perspective view schematically illustrating a filter 150 for a display device and FIG. 2 is a cross-sectional view for explaining the filter 150 of FIG. 1.

Referring to FIGS. 1 and 2, the filter 150 according to this embodiment includes a base 152, an external light blocking pattern 154 formed at the base 152, an electromagnetic wave blocking layer 156 formed on the base 152. According to another embodiment of the present invention, the external light blocking pattern 154 can be formed on the same surface as the electromagnetic wave blocking layer 156. Furthermore, the external light blocking pattern 154 can be formed at both surfaces of the base 152.

The base 152 can have a shape of plate. The base 152 enables a conventional transparent substrate to be removed and takes the place of the substrate. This enables the filter 150 to have simple structure, to be cost-effective, to be light-weight and thin, and to have flexibility.

Here, a thickness (T) of the base 152 along a Z-axis can be uniform all over the area in ranges of 100 μm~5 mm. The base 152 with thicknesses of 100 μm or more can enable the filter 150 to be flexible and thin as much as possible within the bounds that it secures mechanical and thermal endurance. On the other hand, the base 152 with a thickness of 5 mm or less can enable the filter 150 to secure mechanical endurance as much as possible within the bounds that it is flexible and thin and secures light-transmittance.

The base 152 can include transparent polymer resin and a color compensation colorant mixed in the transparent polymer resin. In addition, the base 152 can further include a UV absorbent. Here, the term, "transparent" means that a light transmittance is 80% or more, preferably 90% or more. In addition, a haze of the base 152 can be 5% or less, preferably 2% or less. Here, the light transmittance and haze are values measured according to JIS-K7136.

The transparent polymer resin forms a basic structure of the base 152 which has a shape of plate.

Diverse resins can be used as the transparent polymer resin as long as they have high transmittance. Resins which are light-weight and easy to deal with, for example, at least one of a polyester type resin, an acrylic type resin, a cellulose type resin, a polyolefin type resin, a polyvinyl chloride type resin, a polycarbonate type resin, a phenol type resin and a urethane type resin can be used as the transparent polymer resin.

Among them, a polyester type resin and a polycarbonate type resin which has good balance between thermal endurance and flexibility are preferable, and a bi-axially oriented polyester type resin and a bi-axially oriented polycarbonate type resin are more preferable.

Polyester of the polyester type resin can be obtained through causing esterification between aromatic compounds such as terephthalic acid, isophthalic acid, and naphthalene dicarboxylic acid and glycol or ester interchange and then causing polycondensation. The polyester can be provided in the form of polymer chip.

Polycarbonate can be obtained through transesterification in which bisphenol reacts with diaryl carbonate and hydroxyaryl is emitted. The polycarbonate can be provided in the form of polymer chip.

The color compensation colorant can include a neon light cut colorant. Furthermore, the color compensation colorant can include other colorants as well as the neon light cut colorant.

The neon light cut colorant is for cutting orange light which can be intensely emitted from a panel assembly. Light emitted from the panel assembly itself and light which is incident onto the panel assembly and then is reflected from the panel assembly tend to have orange color.

Accordingly, in the present invention, the base 152 preferably includes the neon light cut colorant which can absorb light having wavelengths of 550 nm~610 nm as much as 10%~90%. This reduces the emission of the neon light and then improves color purity and color reproduction range.

Diverse colorants can be used as the neon light cut resin as long as they can absorb light having the wavelengths of 550 nm~610 nm as much as 10%~90%. The neon light cut colorant can be at least one of a cyanine type colorant, a polymethine type colorant, a squarylium salt type colorant, a phthalocyanine type colorant, a naphtalocyanine type colorant, a quinone type colorant, an azaporphyrin type colorant, an azo type colorant, an azochelate type colorant, a indoanilinechelate type colorant, an indonaphtolchelate type colorant, a dithiol metal complex type colorant, a pyrromethene type colorant, an azomethine type colorant, a xanthen type colorant, an azlenium type pigment, a pirillum type pigment, a croconium type pigment and an oxonol type colorant.

Among them, a colorant which endures temperatures of 200° C. or more when viewing from the standpoint of initial decomposition temperature can be used as the neon light cut colorant.

A transmittance of the UV absorbent included in the base 152 is preferably 10% or less at a wavelength of 380 nm, more preferably 10% or less at a wavelength of 390 nm, still more preferably 10% or less at a wavelength of 400 nm.

An organic UV absorbent or an inorganic UV absorbent can be used as the UV absorbent, but the organic UV absorbent can be preferable when viewing from the standpoint of transmittance. Here, known UV absorbents can be used as the UV absorbent. Among them, benzotriazole, benzophenone, and cyclic imino ester are preferable, and cyclic imino ester is more preferable when viewing from the standpoint of thermal endurance. Furthermore, more than two of the above-mentioned absorbents can be used together.

The external light blocking pattern 154 can absorb light incident from the outside. When the filter 150 is installed in the PDP device, the external light blocking pattern 154 blocks a part of light (IL1) and totally reflects a part of light (IL2) to the outside among light (IL) emitted from the panel assembly. This enables the external light blocking pattern 154 to improve a Contrast Ratio of the PDP device, especially a Bright Room Contrast Ratio (BRCR) thereof. Here, an unexplained reference numeral (IL3) denotes a part of light straightly transmitted through the base 152 among light (IL) emitted from the panel assembly.

In FIG. 2, the external light blocking pattern 154 is formed in a wedge shape in an inward direction, that is, along an -Z axis and in a stripe shape along an X-axis. However, the present invention is not limited thereto. For example, the external light blocking pattern 154 can be formed to project from a surface of the base 152. The external light blocking pattern 154 can have a variety of shapes such as a wave shape, a mesh shape, etc as well as a stripe shape. In addition, the external light blocking pattern 154 can be formed to have a uniform or random curvature along an X-axis. The external light blocking pattern 154 can have any one of a triangle shape, a tetragon shape, an oval shape, a rhombus shape, a trapezoid shape, random shapes, etc. on an YZ plane, that is, on a cross-sectional plane of the external light blocking pattern 154.

In order to effectively block the external light (EL), it is preferable that a ratio of height to width (height/width) of the external light blocking pattern 154 is large. However, considering a thickness of the base 152 and a pitch of the external light blocking pattern 154 as well, the ratio of height to width was given at least 5:1.

The external light blocking pattern 154 can include a UV curable polymer resin and an external light blocking material.

A urethane type resin or an acrylic type resin having refraction indices of 1.35~1.6 can be used as the UV curable polymer resin.

A carbon black can be used as the external light blocking material, but the present invention is not limited thereto. For example, a material whose surface is treated to be black, a black and opaque material such as a conductive polymer resin, a carbon nano tube, etc can be used as the external light blocking material.

The electromagnetic wave blocking layer 156 effectively blocks electromagnetic waves emitted from the panel assembly. An electromagnetic wave blocking layer can be classified into a conductive mesh film type and a transparent conductive film type. Hereinafter, the electromagnetic wave blocking layer of the transparent conductive film type will be exemplified.

The electromagnetic wave blocking layer can include a transparent conductive film formed on the base 152 and a buffer layer interposed between the base 152 and the transparent conductive film. The buffer layer performs a function of regulating chemical stability and conductivity of the transparent conductive layer. The buffer layer may be excluded.

The transparent conductive film can be formed in the form of multiple layers. Specifically, the transparent conductive film can be formed in such a manner that basic structures each of which includes at least one of a metal film, a high refractive transparent film and a low refractive transparent film are multi-stacked. For example, the basic structure can be formed in such a manner that the metal film is interposed between the high refractive transparent film and the low refractive transparent film, and the transparent conductive film can be formed in such a manner that the basic structures are multi-stacked.

The metal film can include at least one of gold, silver, copper, white silver, and palladium, but the present invention is not limited thereto. Since metal can reflect and absorb light over a wide range of wavelength, the metal film provides high conductivity, and high ability of blocking near infra red rays. However, the metal film can make transmittance of visible light decrease.

The high refractive transparent film can include at least one of indium tin oxide, antimony oxide, indium oxide, tin oxide, zinc oxide, titanium oxide, zirconium oxide, selenium oxide, aluminum oxide, lanthanum oxide, and sesqui oxide, but the present invention is not limited thereto. The high refractive transparent film has a lower conductivity and reflectivity but a higher transmittance than the metal film. Here, "high refractive" means that a refraction index is within ranges of 1.5~2.3.

The low refractive transparent film can include at least one of a metal oxide, fluoride particles, and an amorphous fluoropolymer but the present invention is not limited thereto. For example, silicone oxide, magnesium fluoride, calcium fluoride, and lithium fluoride can be used as the metal oxide. Examples of the amorphous fluoropolymer are multifunctional (meth)acrylate ester and vinyl ether into which long chain fluoro-alkylene, fluoro-cyclo-alkylene, etc are introduced. Here, "low refractive" means that a refraction index is within ranges of 1.3~1.6.

The electromagnetic wave blocking layer can have an anti-reflection function, but the present invention is not limited thereto. For example, the base 152, instead of the electromagnetic wave blocking layer, can have an anti-reflection function. Furthermore, both the base 152 and the electromagnetic wave blocking layer can have an anti-reflection function.

The mesh film includes a mesh pattern of conductive material. Generally, a grounded metal mesh, a metal coated synthetic resin, or a metal coated metal fiber can form the mesh pattern.

The metal mesh pattern can be made of material which has good electrical conductivity and is easy to form, such as copper, chrome, nickel, silver, molybdenum, tungsten, aluminum, etc.

The transparent conductive film or the mesh film can be formed directly on the base 152. According to another embodiment, the transparent conductive film or the mesh film can be formed independently of the base 152 and then adhere to or bond with the base 152. In case of the mesh film formed independently, the mesh pattern is typically formed on a base for the mesh film. A near infrared ray absorbing colorant can be included in the base for the mesh film to block near infrared rays.

Since the base 152 is made of transparent polymer resin in the filter 150 according to this embodiment, it is possible to make the filter 150 light-weight and thin. In addition, it is possible to provide the filter 150 which can be used for a flexible display device. In addition, since the base 152 has a color compensation function, the filter 150 can have simple structure, while it can perform multi-functions. Accordingly, it is possible to reduce cost of the filter 150 and the PDP device.

However, the present invention does not exclude an embodiment in which the filter 150 includes a transparent substrate of glass or polymer resin. In such an embodiment, the electromagnetic wave blocking layer can be typically formed on the transparent substrate. Here, the electromagnetic wave blocking layer can be formed directly on the transparent substrate or can adhere to or bond with the transparent substrate.

The transparent substrate, the electromagnetic wave blocking layer and the base 152 can be stacked in the order named, or the transparent substrate can be interposed between the electromagnetic wave blocking layer and the base 152.

The filter 150 according to this embodiment can be fabricated by the following process.

First, the neon light cut colorant is mixed in the transparent polymer resin forming the basis of the base 152. The mixture is melted. The base 152 can be formed by an extruding method. A counter pattern to the external light blocking pattern 154 is formed on the extruded base 152 by using a pattern roll. The counter pattern is filled with the UV curable polymer resin and the external light blocking material. The external light blocking pattern 154 is irradiated with UV. The electromagnetic wave blocking layer 156 is formed on the other surface of the base 152 by using a sputtering method, etc, whereby the filter 150 according to this embodiment is completed.

Figure 3:
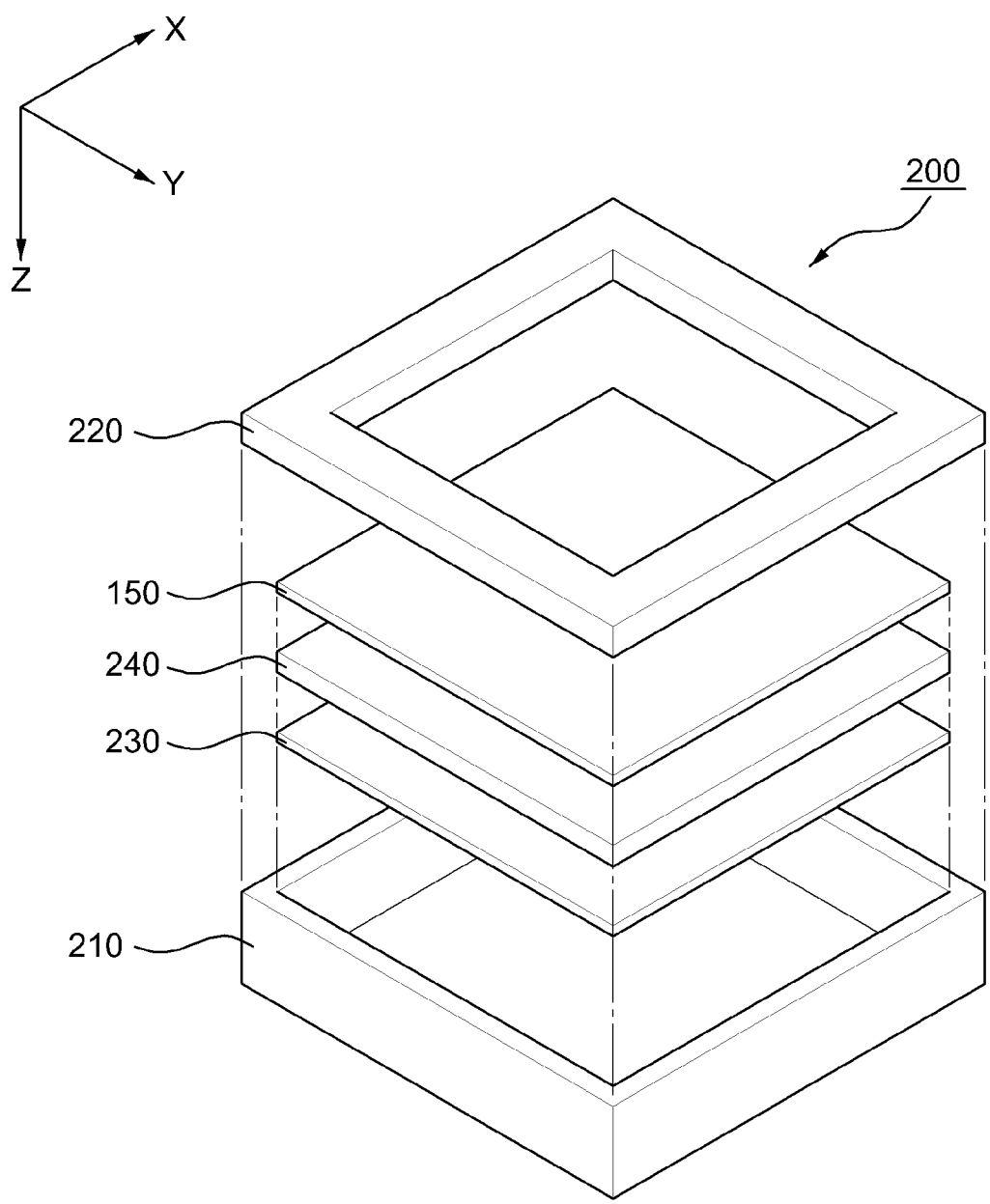
FIG. 3 is an exploded perspective view for schematically explaining the display device.

FIG. 3 is an exploded perspective view schematically illustrating a PDP device.

Referring to FIG. 3, the PDP device 200 include a case 210, a cover 220 covering the case 210, a driving circuit board 230 housed in the case 210, a panel assembly 240 which includes light emitting cells in which gas discharge generates and displays images, and the filter 150 installed in front of the panel assembly 240. The electromagnetic wave blocking layer 156 can be grounded through the cover 220 to the case 210. This prevents electromagnetic waves and near infrared rays from reaching a viewer.

What is claimed is:

1. A filter for a display device comprising:
    a base including a transparent polymer resin and a color compensation colorant mixed in the transparent polymer resin;
    an external light blocking pattern disposed within the base, such that the external light blocking pattern extends into the transparent polymer resin with the color compensation colorant mixed therein; and
    an electromagnetic wave blocking layer formed on the base.

2. The filter for the display device of claim 1, wherein the transparent polymer resin is at least one of a polyester type resin, an acrylic type resin, a cellulose type resin, a polyolefin type resin, a polyvinyl chloride type resin, a polycarbonate type resin, a phenol type resin and a urethane type resin.

3. The filter for the display device of claim 1, wherein the color compensation colorant includes a neon light cut colorant.

4. The filter for the display device of claim 3, wherein the neon light cut colorant is at least one of a cyanine type colorant, a polymethine type colorant, a squarylium salt type colorant, a phthalocyanine type colorant, a naphthalocyanine type colorant, a quinone type colorant, an azaporphyrin type colorant, an azo type colorant, an azochelate type colorant, a indoanilinechelate type colorant, an indonaphtholchelate type colorant, a dithiol metal complex type colorant, a pyrromethene type colorant, an azomethine type colorant, a xanthen type colorant, an azlenium type pigment, a pirillum type pigment, a croconium type pigment and an oxonol type colorant.

5. The filter for the display device of claim 1, wherein the base has thicknesses of 100 um~5 mm.

6. The filter for the display device of claim 1, wherein a cross section of the external light blocking pattern has a shape of triangle, quadrangle, oval, rhombus or trapezoid.

7. The filter for the display device of claim 1, wherein a ratio of height to width of the external light blocking pattern is 5 or more.

8. The filter for the display device of claim 1, wherein the electromagnetic wave blocking layer includes a transparent conductive film and a buffer layer interposed between the base and the transparent conductive film.

9. The filter for the display device of claim 1, wherein the electromagnetic wave blocking layer includes a mesh film with a mesh pattern of conductive material.

10. The filter for the display device of claim 1, further comprising a transparent substrate, wherein the transparent substrate is interposed between the electromagnetic wave blocking layer and the base.

11. The filter for the display device of claim 1, further comprising a transparent substrate, wherein the electromagnetic wave blocking layer is interposed between the transparent substrate and the base.

12. A method for fabricating a filter for a display device comprising the steps of:
   preparing a base which includes a transparent polymer resin and a color compensation colorant mixed in the transparent polymer resin;
   disposing an external light blocking pattern within the base, such that the external light blocking pattern extends into the transparent polymer resin with the color compensation colorant mixed therein; and
   forming an electromagnetic wave blocking layer on the base.

* * * * *